July 14, 1925.
G. D. NEIMAN
TIRE FILLER
Filed Dec. 7, 1923
1,545,568
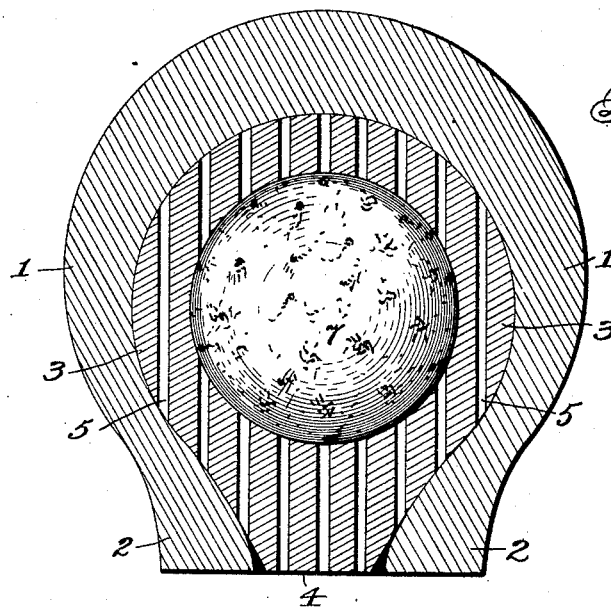
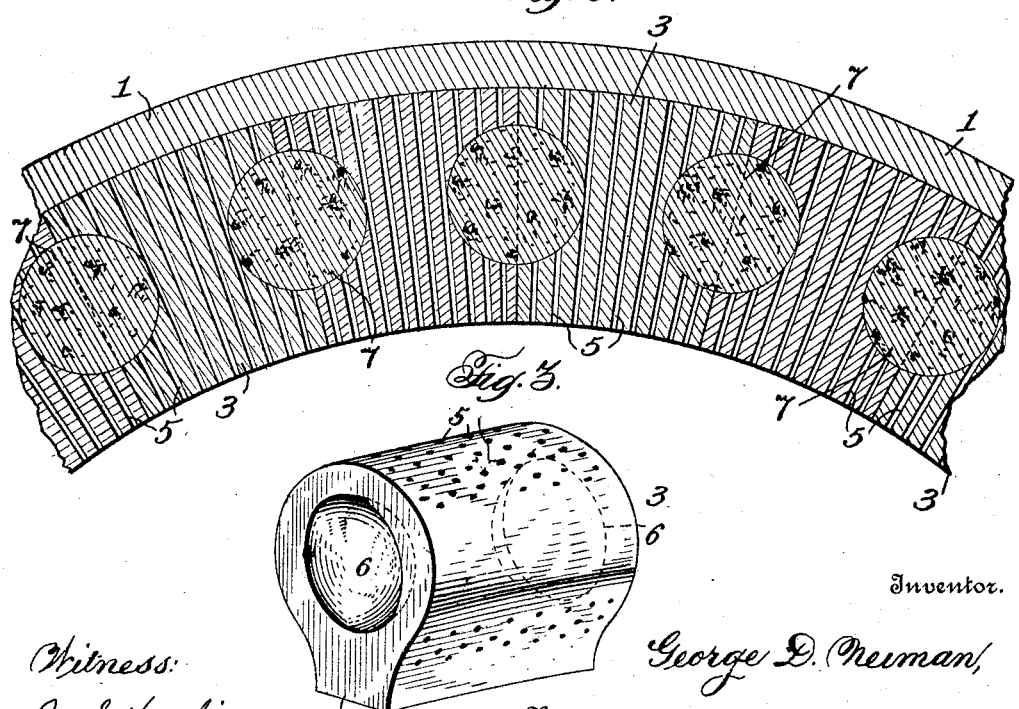
Inventor.
George D. Neiman,
Witness:
Jas. E. Hutchinson.
By Milano & Milano
Attorneys.

Patented July 14, 1925.

1,545,568

UNITED STATES PATENT OFFICE.

GEORGE D. NEIMAN, OF BOULDER, COLORADO.

TIRE FILLER.

Application filed December 7, 1923. Serial No. 679,174.

*To all whom it may concern:*

Be it known that I, GEORGE D. NEIMAN, a citizen of the United States, residing at Boulder, in the county of Boulder and State of Colorado, have invented certain new and useful Improvements in Tire Fillers, of which the following is a specification, reference being had therein to the accompanying drawing.

My invention relates to new and useful improvements in tire fillers or cores and has for its principal object the provision of a filler or core which is adapted to be placed within a casing usually employed in pneumatic tires the said core or filler taking the place of the usually used pneumatic tube and preventing blow-outs or punctures but at the same time providing sufficient resiliency to take up shock as would be the case with the employment of a pneumatic tire.

A further object of the invention resides in the provision of a filler or core which will be light in weight yet resilient and yieldable to the desired degree and which will not be affected by climatic conditions nor liable to deterioration or to become hardened or compact due to impacts or the like.

Another object of the invention consists in forming the filler or core of a plurality of sections whereby it may be readily positioned within the casing and providing means for interlocking the sections so as to properly position them within the casing, said interlocking means being in the form of a sphere preferably of light material such as cork and the sections being preferably formed of rubber or similar resilient material provided with a plurality of openings therethrough, said openings permitting the necessary shock absorption and allowing the passage of air therethrough to keep the filler or core, the interlocking sphere, and the casing in cool condition at all times.

As a further object the invention provides a filler or core made up of a plurality of sections, the sections being provided in each end with a recess so that when two sections are brought together an opening will be provided for the reception of the interlocking sphere and each section also having on its lower surface or base a projection which will extend between the edges of the casing which are received in the tire rim, said projections being of a sufficient width so that when the tire is positioned within the rim there will be a tight engagement between the casing and filler so as to prevent any creeping or slipping of the filler or core with respect to the casing or both the casing and filler or core with respect to the tire rim.

With the above and other objects in view, which will appear as the description proceeds, my invention consists in the novel details of construction, and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a transverse radial section through the tire casing and filler with one of the interlocking spheres shown in elevation.

Fig. 2 is a longitudinal vertical section through the casing and filler, and

Fig. 3 is a perspective of one of the filler sections.

In the drawings 1 indicates the tire casing, of usual construction, having the edge portions 2 which are adapted to be received between the side flanges of the tire rim. My improved filler or core is made up of a plurality of sections 3 which, as more clearly illustrated in Fig. 2 of the drawings, are longitudinally curved, with their ends slightly inclined, so that when the sections are positioned within the casing they will form a ring to conform to the circumferential curvature of the casing. As shown in Figs. 1 and 3 the body portions of the sections are substantially round in cross section and are provided on the bottom or base with a downwardly extending projection 4, said projections extending into the space between the side edges 2 of the casing so that when the tire is positioned upon the tire rim, and the side edges 2 are engaged between the flanges of the rim, there will be a tight engagement of the casing with the core or filler, the edges of the casing engaging the sides of the projections 4 and preventing slipping or creeping of the filler or core with respect to the casing and the casing and filler or core with respect to the rim. Each section of the filler or core is provided with a plurality of openings or passages 5 and while I have shown said openings or passages as extending vertically through the sections it will be understood that, if desired, they might be extended at various angles. The sections 3 are formed of rubber or other resilient material and the openings or passages 5 permit of the necessary shock absorption, when the tire is in use, and at the same time allow for the passage or circulation of air through the filler, said circulation of the air cooling the casing, and the filler.

The sections 3 are provided, at each end, with a concaved recess 6, said recesses of adjacent sections forming a circular opening when the sections are brought together for positioning within the casing. It will be noted that some of the openings or passages 5 intersect the recesses 6. For connecting the sections, as well as for reducing the weight of the filler and at the same time to provide means for carrying the required load and pressure and to retain the correct working height of the filler under actual service I provide the spheres or balls 7 which are preferably of cork. These balls or spheres may be made of ground cork held together by a suitable adhesive substance or may be formed of strips or flat pieces secured together and cut in the desired shape. When the sections are together the balls or spheres will be received in the recesses formed in the ends of the sections 3 and will interlock the said sections as more clearly illustrated in Fig. 2 of the drawings.

From the above detail description it will be seen that I have provided a novel form of filler or core which will be of the desired resiliency, which may be easily positioned within the casing, and so formed as to allow the circulation of air for cooling purposes, means also being provided to prevent creeping or slipping. The rubber sections will allow for the resiliency to take up shock or jars and the balls or spheres of cork or similar material will act as a support to maintain the core at the correct height or shape, under actual service, to carry the load. The spheres or balls of cork also act as the means for interlocking the sections and being of less weight than rubber will make the tire core or filler of less weight than would be the case if entirely of rubber or similar material.

It will be understood that the sections 3 may be of varying lengths and although I have illustrated the members 7 in the form of balls or spheres they might be of various shapes such as oval. The sections may also be made of varying diameters for use in casings of different diameters. The filler or core will take, as has been previously stated, the place of the ordinary pneumatic inner tube and while providing the required resiliency desired in tires of this character will prevent all possibilities of blow-outs or punctures. At the same time the filler or core may be used in different casings, being changeable from one casing to another when a casing becomes worn.

Having fully described my invention what I claim as new and desire to secure by Letters Patent is:

1. A tire filler comprising a plurality of sections of resilient material, each section having a recess in each end, and members received in the recesses for interlocking the sections, said members being of relatively rigid material.

2. A tire filler comprising a plurality of sections having air circulating passages therethrough, each section having recesses formed in its ends, some of the air passages intersecting the recesses, and means received in the recesses for interlocking the sections.

3. A tire filler comprising a plurality of sections of resilient material, each section having a recess in each end and a plurality of air passages therethrough, some of the air passages intersecting the recesses, and members received in the recesses for interlocking the sections, said members being of relatively rigid material.

4. A tire filler comprising a plurality of resilient sections, each section having a longitudinally extending projection on the lower surface thereof, a recess in each end, and air passages therethrough, some of the air passages extending through the projection and others intersecting the end recesses, and means received in the end recesses for interlocking adjacent sections.

In testimony whereof I hereunto affix my signature.

GEORGE D. NEIMAN.